United States Patent [19]
Candor et al.

[11] 3,879,858
[45]*Apr. 29, 1975

[54] METHOD AND APPARATUS FOR TREATING POROUS MATERIAL WITH FLUID

[76] Inventors: Robert R. Candor, 5940 Munger Rd., Miami Township, Ohio 45459; James T. Candor, 5440 Cynthia Ln., Washington Township, Ohio 45429

[ * ] Notice: The portion of the term of this patent subsequent to Jan. 27, 1987, has been disclaimed.

[22] Filed: Aug. 17, 1973

[21] Appl. No.: 389,260

Related U.S. Application Data

[60] Division of Ser. No. 167,206, July 29, 1971, Pat. No. 3,771,236, said Ser. No. 167,206, is a continuation-in-part of Ser. No. 105,894, Jan. 12, 1971, Pat. No. 3,699,663.

[52] U.S. Cl. ............ 34/16; 34/23; 34/92; 34/115; 34/155
[51] Int. Cl. .............................. F26b 5/05
[58] Field of Search ........... 34/16, 23, 92, 115, 116, 34/117, 118, 123, 151, 155, 162

[56] References Cited
UNITED STATES PATENTS

| | | | |
|---|---|---|---|
| 2,838,420 | 6/1958 | Valente | 34/162 |
| 2,888,378 | 5/1959 | Maguire | 162/210 |
| 3,303,576 | 2/1967 | Sisson | 162/207 |
| 3,358,388 | 12/1967 | Weiss et al. | 34/151 |
| 3,657,069 | 4/1972 | Candor et al. | 162/205 |
| 3,771,236 | 11/1973 | Candor et al. | 34/23 |

*Primary Examiner*—Carroll B. Dority, Jr.
*Assistant Examiner*—Larry I. Schwartz
*Attorney, Agent, or Firm*—Candor, Candor & Tassone

[57] ABSTRACT

In air-through dryers for wet sheet-like material, such as paper, textiles, etc., the moist sheet-like material is passed adjacent a high velocity air hood so as to be subjected to an air pressure differential across the same. Thus, heated or unheated air is caused to be engaged against one side of the sheet-like material and pass therethrough to the other side thereof to remove moisture from such sheet-like material as the air passes therethrough, such moisture being removed by a pushing out of the moisture by the air, by air entrainment and/or by adiabatic evaporation. A belt means of this invention comprising a perforated flexible wall carrying a felt, fabric or other similar material on one side thereof is utilized in a manner to engage against the moist sheet-like material to compress the same during the passage of air through the perforated flexible wall and through the moist sheet-like material to assist in the water removal thereof by either tending to cause the porosity of the drying sheet-like material to remain substantially constant so that an optimum substantially constant air flow passes therethrough or to cause a greater air flow rate through the wetter portions of said sheet-like material than through the drier portions thereof.

24 Claims, 12 Drawing Figures

METHOD AND APPARATUS FOR TREATING POROUS MATERIAL WITH FLUID

This application is a divisional application of its copending parent application, Ser. No. 167,206, filed July 29, 1971, now U.S. Pat. No. 3,771,236.

Said parent application, Ser. No. 167,206 is a continuation-in-part application of its copending parent U.S. patent application, Ser. No. 105,894, filed Jan. 12, 1971, now patent No. 3,699,663, which, in turn, is related to applicatns' copending application, Ser. No. 886,090, filed Dec. 18, 1969, now U.S. Pat. No. 3,657,969 and entitled "METHOD AND APPARATUS FOR TREATING SHEET-LIKE MATERIAL WITH POROUS AND/OR PERMEABLE SHEET MEANS", and is related to applicants' copending application entitled "METHOD AND APPARATUS FOR TREATING SHEET-LIKE MATERIAL AND THE LIKE", filed Oct. 20, 1969, ser. No. 868,396, and now U.S. Pat. No. 3,592,585, which is a continuation-in-part application of its copending patent application, Ser. No. 690,636, filed Dec. 14, 1967, now U.S. Pat. No. 3,491,386, which, in turn, is a continuation-in-part application of its copending U.S. patent application, Ser. No. 635,848, filed May 3, 1967, now U.S. Pat. No. 3,447,174.

This invention relates to means for improving the fluid treating of sheet-like material wherein the fluid is caused to pass through the sheet-like material to treat the same, such as to remove moisture therefrom during a drying operation on the sheet-like material.

One of the features of the aforementioned patent applications is to provide a squeezing action on the material to be treated at the same time that gaseous fluid is being passed through the material to remove retained moisture thereof, the compressing or squeezing action being provided by means creating a pressure differential across a flexible nozzle means that engages against the material and has opening means through which the fluid flow takes place.

One feature of the present invention is to provide improvements in known air-through dryers of paper making apparatus by utilizing the aforementioned compressing features of applicants' prior applications.

In particular, one embodiment of this invention provides a belt means which has a preforated flexible wall on one side thereof and a relatively open fabric covering on the other side thereof so that the fabric side of the belt means can engage against one side of the paper web that is to be dried whereby a pressure differential created across such belt means will cause the belt means to compress the paper web against a backing structure and will cause an air flow to pass through the perforations of the belt means, through the paper web and through the backing means to not only remove moisture from the paper web in substantially sheet form, but to also thereafter entrain water particles therefrom in a manner well known in the art and/or cause evaporation of the remaining moisture in a manner well known in the art. In this manner, the belt means of this invention provides the same function as the nozzle means of the aforementioned patent applications.

Further, it will be seen that another of the features of this invention is to provide a means for maintaining the porosity of the paper web substantially constant even though the web is being dried so that the air flow through such drying web will be substantially constant from the inlet side of the air through apparatus to the outlet side thereof.

This feature is accomplished by continuously and/or progressively comprising the paper web as it is being dried by the air flow passing therethrough, so that the porosity of the web remains substantially the same in the air through apparatus regardless of the amount of moisture being removed therefrom.

However, another feature of this invention is to tend to cause a greater air flow rate through the wetter sections of paper web than through the drier sections thereof to compensate for irregularities in making paper webs or merely to more effectively dry the paper web as the case may be.

Accordingly, it is an object of this invention to provide an improved apparatus having one or more of the novel features set forth above or hereinafter shown or described.

Another object of this invention is to provide an improved method having one or more of the novel features set forth above or hereinafter shown or described.

Other objects, uses and advantages of this invention will be apparent from a reading of this description which proceeds with reference to the accompanying drawings forming a part thereof and wherein:

While the various features of this invention are hereinafter described and illustrated as being particularly adapted to remove moisture from paper webs as the same are being formed in conventional paper making apparatus, it is to be understood that the various features of this invention can be utilized singly or in any combination thereof to provide means for treating other materials, such as textiles, food products, etc., as desired.

Further, while this invention is described in connection with only one dryer drum for each type of paper making machine, it is to be understood that the belt means of this invention could be utilized with one or more airthrough dryer drums for any one paper making apparatus, as desired.

Therefore, this invention is not to be limited to only the embodiments illustrated in the drawings, because the drawings are merely utilized to illustrate some of the wide variety of uses of this invention.

Further, while the embodiments of this invention are illustrated in the drawings as providing arcuate paths of travel for the sheet means being treated by the air flow, it is to be understood that such sheet means can be passed in a substantially straight line manner through the apparatus as set forth in certain of the aforementioned patent applications.

Figure 1:
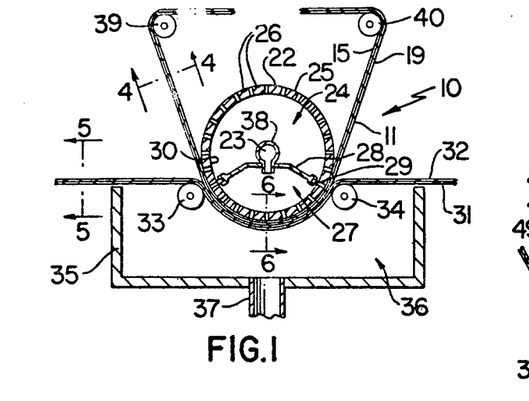
FIG. 1 is a fragmentary, cross-sectional view illustrating one prior known air-through dryer utilizing the features of this invention.

Referring now to FIG. 1, an air-through drying apparatus is generally indicated by the reference numeral 10 and comprises an air-through drying apparatus as set forth in FIG. 1 of the U.S. Pat. Holden, No. 3,284,285, that is modified by a belt means 11 of this invention in a manner hereinafter described, the airthrough dryer 10 of FIG. 1 will be hereinafter referred to as the Holden dryer and reference is hereby made to such Holden patent for particular details of the structure, theory and operation of the Holden dryer that are not hereinafter set forth.

Figure 2:
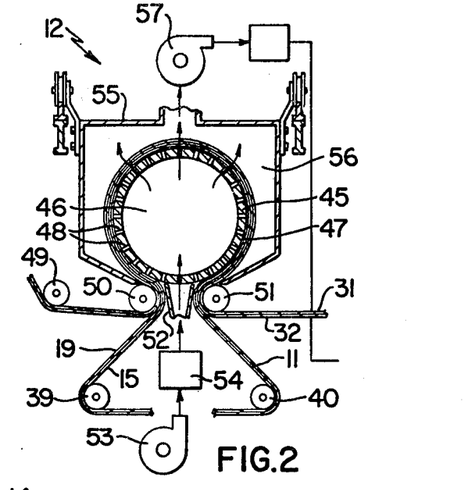
FIG. 2 is a view similar to FIG. 1 illustrating another type of prior known air-through dryer utilizing the features of this invention.

In FIG. 2, another air-through dryer is generally indicated by the reference numeral 12 and is of the type disclosed in FIG. 1 of the U.S. Pat. Sisson, No. 3,303,576, that is modified by the improved belt means 11 of this invention in a manner hereinafter described, the airthrough dryer 12 of FIG. 2 being hereinafter referred to as the Sisson dryer and reference is hereby made to such Sisson patent for particular details of the structure, theory and operation of the Sisson dryer that are not hereinafter set forth.

Figure 3:
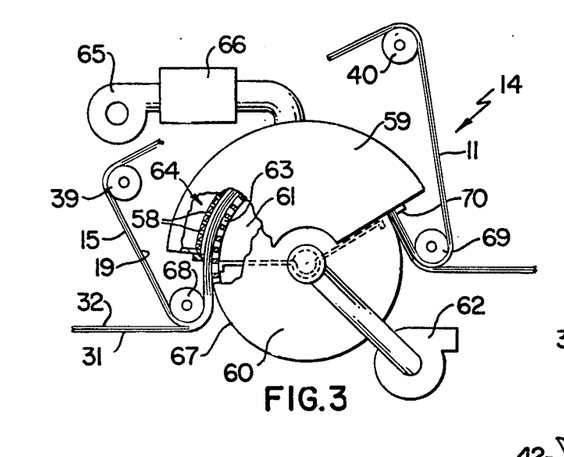
FIG. 3 is a view similar to FIG. 1 and illustrates another prior known air-through dryer utilizing the features of this invention.

Referring now to FIG. 3, another air-through dryer is generally indicated by the reference numeral 14 and is of the type set forth in FIG. 5 of the Daane, U.S. Pat. No. 3,447,247, that is also modified by the belt means 11 of this invention in a manner hereinafter described, the air-through dryer 14 of FIG. 3 being hereinafter referred to as the Daane dryer and reference is hereby made to such Daane patent for particular details of the structure, theory and operation of the Daane dryer that are not hereinafter set forth.

Figures 8, 9, 11, 12:
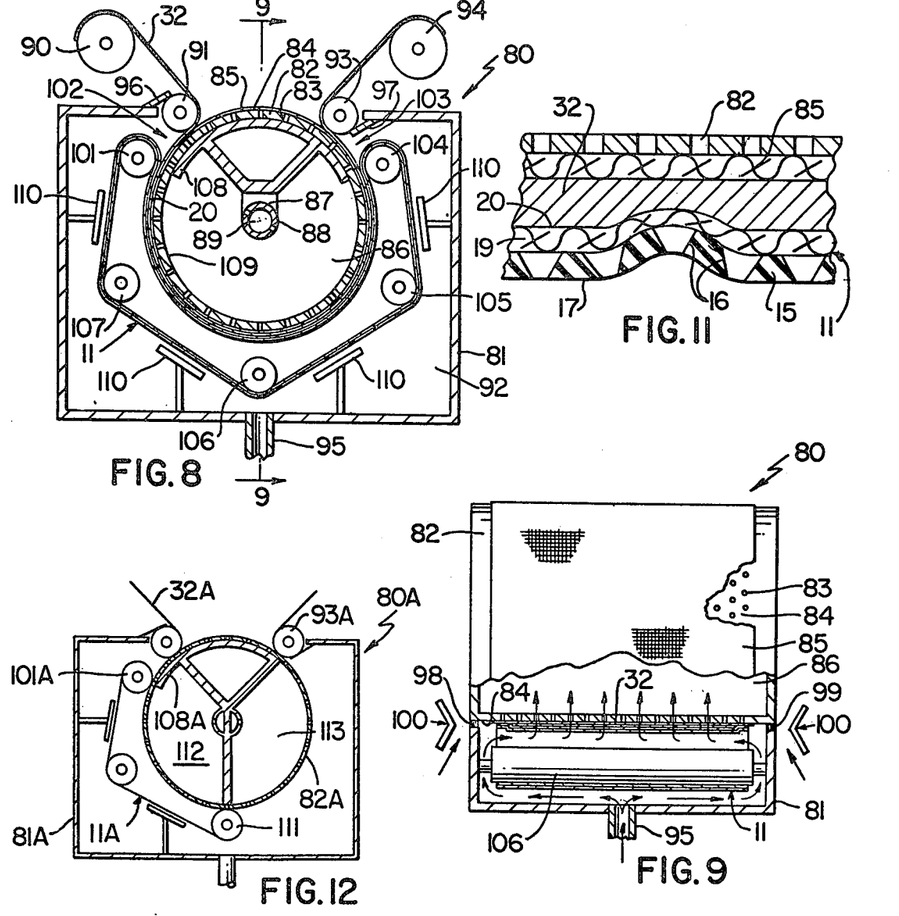
FIG. 8 is a fragmentary, cross-sectional view illustrating another prior known air-through dryer utilizing the features of this invention.
FIG. 9 is a fragmentary, cross-sectional view taken on line 9—9 of FIG. 8.
FIG. 11 is a view similar to FIG. 10 and illustrates how the flexible belt of this invention tends to cause a greater flow rate through the water sections of the web material than through the drier sections thereof.
FIG. 12 is a view similar to FIG. 8 and illustrates another embodiment of this invention.

In FIG. 8, another air-through dryer is generally indicated by the reference numeral 80 and is of the type set forth in FIGS. 1–6 of the Burgess et al., U.S. Pat. No. 3,418,723 that is also modified by the belt means 11 of this invention in a manner hereinafter described, the air-through dryer 80 of FIG. 8 being hereinafter referred to as the Burgess dryer and reference is hereby made to such Burgess et al patent for particular details of the structure, theory, and operation of the Burgess dryer that are not hereinafter set forth.

Figure 4:
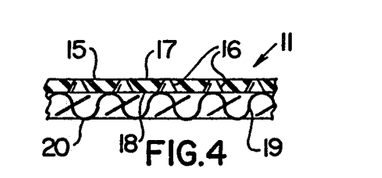
FIG. 4 is an enlarged, fragmentary cross-sectional view taken on line 4—4 of FIG. 1.
Figure 5:
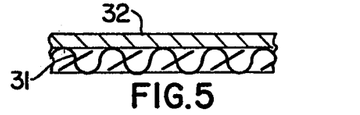
FIG. 5 is an enlarged, fragmentary cross-sectional view taken on line 5—5 of FIG. 1.

The improved belt means 11 of this invention that is utilized in the Holden dryer 10, the Sisson dryer 12, the Daane dryer 14 and the Burgess dryer is best illustrated in FIG. 4 and comprises a flexible, perforated sheet 15 having a plurality of openings 16 passing therethrough in any suitable manner to produce a desired compressing and air flow effect that will be apparent hereinafter, the flexibie sheet 15 having opposed sides 17 and 18 and carrying a compressible or non-compressible, relatively open fabric or felt band or covering 19 on the side 18 thereof with the band 19 providing an outer flat surface 20 for engaging against the desired material to be dried by the particular apparatus 10, 12, 14 or 80 as wil be apparent hereinafter. The openness and fiber structure of the covering band 19 can be so selected that the same will not have a tendency to mark or crush a paper web to be dried by the belt means 11, at least not to an adverse degree.

Figure 6:
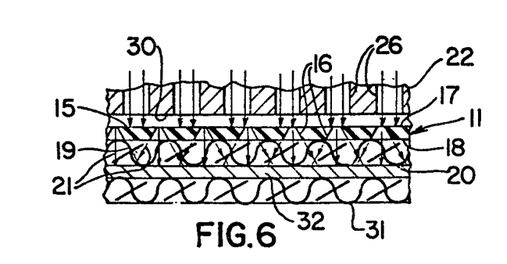
FIG. 6 is an enlarged, fragmentary cross-sectional view taken on line 6—6 of FIG. 1.

The openings 16 through the flexible wall 15 of the belt means 11 of this invention are so selected that the same will permit air or other fluids to pass therethrough in such a manner that the fluid passing through the openings 16 and, through the covering 19 to the outer surface 20 thereof will be somewhat disfused by the covering 19 so that while jet-like fluid flow is passing through the belt means 11 as will be apparent hereinafter, such jet-like air means is substantially uniform and completely covering and flowing out of the outer surface 20 thereof in a manner somewhat produced by the jet patterns 21 schematically illustrated in FIG. 6 and hereinafter more fully described. Of course, the openings 16 can be formed in any manner to enhance the jet action of the fluid passing therethrough. For example; the openings 16 can be substantially frusto-conically shaped in the manner illustrated in FIG. 6. Of course, the openings 16 passing through the flexible wall 15 may be in slot form, or other configurations, if desired.

In any event, one of the features of the openings 16 of the flexible wall 15 of the belt means 11 is to permit a suitable fluid pressure to build up on the side 17 thereof so as to cause the flexible wall 15 to be moved in a direction away from the pressure build up on the side 17 thereof while still permitting fluid flow through the openings 16 thereof in high velocity jets as will be apparent hereinafter.

The Holden air-through dryer 10 of FIG. 1 comprises a rotatable cylinder or roll 22 rotatably mounted on a hollow shaft 23 and having a hollow interior 24 fluidly interconnected to the exterior peripheral surface 26 thereof by a plurality of openings 26 passing therethrough, the openings 26 being substantially non-restrictive to fluid flow therethrough. The interior 24 of the cylinder 22 is divided into a pressure chamber 27 by stationary baffle means 28 carried by the shaft 32 that have sealing ends 29 for sealing engagement with the interior peripheral surface 30 of the roll 22 in the manner fully set forth in the aforementioned U.S. patent to Holden.

A fabric, felt or foraminous support means or belt 31 is adapted to carry a moist paper web 32 thereon and convey the same through a first nip defined by the cylinder 22 and a roller 33 with the paper 32 facing the exterior surface 25 of the cylinder 22, around part of the cylinder 22 and through another nip created by a roller 34 cooperating with the cylinder 22, the paper sheet 32 and carrier 31 moving in unison from left to right in FIG. 1 whereby the paper sheet 32 would be held directly against the exterior surface 25 of the drum 22 adjacent the chamber 27 of the drum 22 if the belt means 11 of this invention were not utilized. If desired, a suitable chamber defining housing 35 can be disposed adjacent the roll 22 so as to define a chamber 36 on the other side of the chamber 27 of the roll 22, the chamber 36 being adapted to be interconnected to a vent or suction pump (not shown) by a conduit means 37.

The chamber 27 of the roll 22 is adapted to be pressurized by a suitable air pressure source (not shown) leading to the chamber 27 through the axially disposed hollow shaft 23 that has an outlet 38 in the manner fully set forth in the patent to Holden et al.

The belt means 11 of this invention is adapted to be fed between the paper sheet 32 and the outside surface 25 of the drum 22 at the roller means 33 and be separated therefrom at the roller means 34 as illustrated in FIG. 1 while passing around suitable guide rollers 39 and 40 leading respectively to and away from the drum 22 as illustrated with the band or covering 19 of the belt means 11 facing toward the paper sheet 32 so as to engage against the paper sheet 32 and move in unison therewith about the roll 22 between the rollers 33 and 34.

Without the belt means 11 of this invention, the aforementioned U.S. patent to Holden teaches that pressurized air in the chamber 27 of the roll 22 is forced out of the openings 26 of the roll 22 directly into the paper sheet 32 and through the paper sheet 32 and foraminous carrier 31 into the chamber 36 of the housing means 35 to be exhausted out of the conduit means 37 thereof as the paper sheet 32 and carrier 31 pass about the roll 22, such air flow through the paper sheet 32 first stripping the moisture therefrom in sheet form and thereafter removing additional moisture by the air entrainment thereof in the air flowing through the paper sheet 32 in the manner previously described.

The U.S. patent to Holden teaches that the carrier 31 can be utilized to compress the paper web against the surface 25 of the roll 22 by placing the carrier 31 under tension between the rollers 33 and 34, the squeezing purpose of the carrier 31 being to reduce the void volume of the sheet 32 so that more water therefrom can be swept directly away by the air flow therethrough rather than by entrainment as would be the case when the sheet 32 is not compressed against the roll 22. In particular, see column 1, lines 39–60 of the U.S. patent to Holden.

The U.S. patent to Sisson states that one of the problems in air-through dryers is that the air flow through the paper web is not uniform across the width of the moist paper web. For example, see column 1, lines 54–71 of the U.S. patent to Sisson.

The U.S. patent to Daane also describes the non-uniform air flow through the paper web as being a problem of air-through dryers. For example, see column 1, lines 63–71 of the U.S. patent to Daane.

The U.S. patent to Burgess et al. while emphasizing the drying effect of the air flow through the web material mainly emphasizes the advantages of having the heated air impinging against the exposed surface of the wet web material to break down the boundary layer at such surface and thereby enhance heat transfer to the wet web.

However, it is believed that by utilizing the belt means 11 of this invention in the Holden air-through dryer 10, as well as in other types of air-through dryers, an improved moisture removable operation will be provided by overcoming the problems mentioned by Sisson and Daane, by having the advantages of Burgess et al., and by further advantages as will be apparent hereinafter. In particular as the air pressure in the chamber 27 presses against the side 17 of the flexible sheet 16 of the belt means 11, the same causes the sheet 15 and covering 19 thereof to move outwardly and thereby compact and compress the paper sheet 32 against the carrier 31 while high velocity jets of air pass through the openings 16 in the flexible wall 15 and through the covering 19 so as to pass completely through the paper sheet 32 as provided by the arrow pattern 21 illustrated in FIG. 6 to remove moisture from the sheet 32 and pass out through the carrier 31 in a manner believed to remove a greater quantity of moisture from the paper sheet 32 since the paper sheet 32 is being continuously compressed by the flexible wall 15 to cause the remaining moisture therein to flow into the voids and fill the same so as to be swept therefrom by the jet air flow passing through the sheet 32 which would not be the case once the larger pores of the sheet 32 had been swept clean by the air. The flexible wall 15 also causes the belt means 11 to conform to the contour of the paper web 32 so that any billowing thereof is taken up by the flexible wall 15. Also, the jets of air passing out of the openings 16 of the wall 15 produce their water sweeping action independently of the action of the other jets in the manner described in the U.S. patent to Daane.

Further, it is believed that as the moisture is continuously being removed from the sheet 32 by the jets of air passing through the openings 16 of the belt means 11 of this invention, so that the paper 32 becomes more porous, a greater pressure differential is caused to exist across the flexible wall 15 to cause the same to compress the paper sheet 32 against the backing 31 with a greater force to thereby tend to maintain the porosity of drier portions of the sheet 32 the same as the wetter portions thereof so that a constant air flow is provided through the sheet 32 from the inlet side of the apparatus 10 to the exist side thereof.

Figure 10:
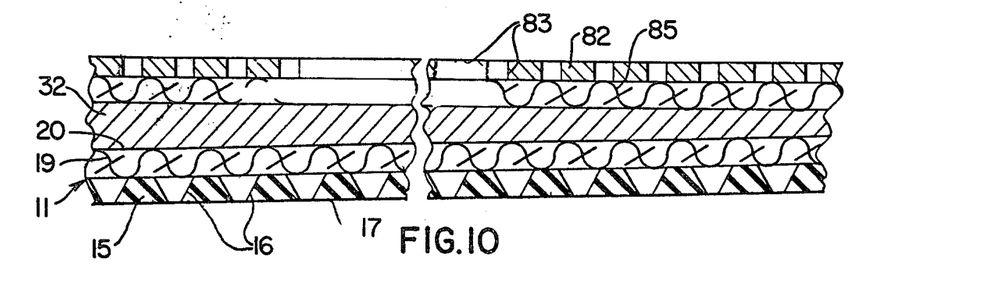
FIG. 10 is a schematic, cross-sectional view illustrating the progressive compacting action of the belt means of this invention on the web to be dried, FIG. 11 illustrating such action in straight line form rather than in circular form as provided by the apparatus of FIG. 8.

This feature of maintaining a constant air flow through the wet web regardless of where a particular section of the wet web is in the air-through dryer is best illustrated in FIG. 10 and will be hereinafter more fully described in connection with the Burgess dryer 80 illustrated in FIGS. 8–11. However, it is to be understood that the description of the constant air flow effect of the belt means 11 in the Burgess dryer 80 will equally apply to the action of the belt means 11 in the other air-through dryers of this application as well as in other applicable air-through dryers.

Thus, it can be seen that the belt means 11 of this invention is believed to enhance the air-through drying action of the Holden air-through dryer 10 by causing a continuous and progressively increasing compression or squeezing of the paper sheet means 32 as the same passes from right to left through the apparatus 10 between the rollers 33 and 34 so as to increase the amount of time that the moisture in the sheet 32 is being swept therefrom as moisture particles so that less time is required to pass air through the sheet means to remove the remaining moisture strictly by an air entrainment action and/or evaporative action. The belt means 11 also uniformily compresses the paper web 32 across the entire width thereof since the flexible wall 16 of the belt conforms to the contours of the sheet 32 and, thus, any billowing thereof relative to the drum 22. The belt means 11 also sweeps moisture from the paper web 32 by a plurality of jets that are independent of each other so that uniform moisture removal is created across the entire width of the paper web 32. Of course, the amount or force of squeezing is so controlled that such force will not adversely affect the sheet 32.

Figure 7:
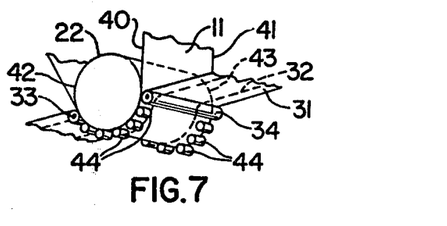
FIG. 7 is a fragmentary, bottom perspective view of the roll means of the apparatus of FIG. 1 illustrating one means of this invention for maintaining the side edges of the belt means of this invention in contact with the peripheral edges of the roll of the apparatus of FIG. 1 and/or FIG. 2.

In order to hold the side edges 40 and 41 of the belt means 11 of this invention in substantially sealing relation with the peripheral side edges 42 and 43 of the roll means 22 between the seals 29 of the baffle means 28 at the chamber 27 so that the pressurized air will not tend to flow out of the same at the sides 40 and 41 thereof, a plurality of rollers 44 can be disposed adjacent the roll 22 at the side edges 42 and 43 thereof to hold the side edges 40 and 41 of the belt means 11 in sealing relation thereagainst as the belt means 11 passes around the roller 22, the paper web 32 having its side edges disposed inboard of the rollers 44 as illustrated by dotted lines in FIG. 7.

Of course, it is to be understood that the belt means 11 can also be directly fastened to and completely around the roll 22 at the side edges 41 and 43 thereof so that the same will perform in the same manner as previously described except that the same will be carried by the drum 22 and not pass around the guide rollers 39 and 40 as illustrated.

The Sisson air-through dryer 12 of FIG. 2 will now be described and such apparatus 12 comprises a roll 45 having a hollow center 46 interconnected to the exterior surface 47 thereof by a plurality of openings 48 passing through the roll 45. A foraminous backing 31 is adapted to pass around the outside surface 45 of the roll 45 by being passed around suitable rollers 49, 50 and 51 as illustrated with one paper sheet 32 passing between the backing 31 and the roll 45 as illustrated so that air inside the chamber 46 in the roll 45 will pass out of the same and through the paper 32 and the backing 31 in somewhat the same manner as the Holden device 10 previously described except that the air under pressure for the interior 46 of the roll 45 is directed into the same from the exterior of the roll 45 by a nozzle means 52 located between the rollers 50 and 51 and receiving air from a suitable fan means 53 that passes the air through suitable heating means 54 to the nozzle means 52 and, thus, through the exterior of the roll 45 into the interior 46 thereof. A removable chamber defining means 55 is provided by the apparatus 12 to be disposed about the outside of the roll 45 and define a chamber 56 that is adapted to be evacuated by suitable fan or pump means 57 so that a resulting pressure differential between the chamber 56 and the interior 46 of the roll 45 will exist across the surface 47 of the drum 45 and cause the heated air in the interior 46 thereof to pass through the openings 48 and, thus, through the paper sheet 32 and backing 31 into the chamber 56 to be exhausted therefrom with such air flow removing moisture from the sheet 42 in somewhat the manner previously described in connection with the Holden device 10.

However, the belt means 11 of this invention is utilized in the Sisson device 12, the belt means 11 being fed by suitable roller means 39 against the outside surface of the paper 32 at the roller 50 so that the covering 19 of the belt means 11 faces the sheet 32 while the flexible wall 15 engages against the roll 45 and is carried about the same to the roller 51 where the belt means 11 is directed away from the roll 45 and around the guide roller 40 in the manner previously described.

Thus, it can be seen that as the paper sheet 32 is fed around the roll 45, the same is being continuously compressed by the belt means 11 of this invention agaist the backing means 31 for the reasons previously set forth in connection with the Holden device 10 so as to progressively squeeze or compress the sheet 32 by the pressure differential being created across the flexible wall 15 in the manner previously described during the air flow through the paper sheet 32 so as to remove a greater quantity of moisture therefrom than when the belt means 11 of this invention is not being utilized.

The Daane air dryer 14 of FIG. 3 is substantially an air impingement device which directs jets of air out of opening means 58 of a stantionary hood 59 toward a perforated roll or drum 60 having the interior 61 thereof evacuated by suitable pump means 62 so that as a paper sheet passes around the roller 60 adjacent the openings 58 of the hood 59, the impinging air will pass directly through the paper sheet and, thus, through the openings 63 of the roll 60 to be exhausted from the interior 61 thereof. The hood 59 includes an interior chamber 64 adapted to receive air under pressure from a pump or fan means 65 with such air being heated by suitable heater means 66 before passing into the interior 64 of the hood 59.

A fabric or foraminous carrier 31 carries the paper sheet 32 and is guided against the exterior surface 67 of the roll 60 by a guide roller 68 so that the fabric 31 engages against the exterior surface 67 of the roll 50 while the nozzle means 58 of the hood 59 directs the jets of air directly against the paper sheet 32 to strip moisture therefrom as the air passes through the paper sheet 32 and into the interior 61 of the drum 60, the paper sheet 32 and fabric carrier 31 being directed away from the roll 60 by guide roller means 69.

However, the belt means 11 of this invention is utilized in the Daane dryer 14, the belt means 11 being also fed around the drum 60 at the roller means 68 and then away from the drum 60 by the roller means 69 with the belt means 11 being fed toward the roller 68 by the roller means 39 and away from the roller means 69 by the roller means 40 in the manner previously described. In this manner, the covering side 20 of the cover means 19 of the belt means 11 will engage against the paper sheet 32 as the same passes around the roll 60 and the jets of air from the opening 58 of the hood or cap 59 will engage against the flexible wall 15 and will cause the belt means 11 to continuously compresses toward the paper sheet 32 and squeeze the same against the backing 31 on the roll 60 while issuing jets of air out of the openings 16 of the belt means 11 for moisture removal from the paper sheet 32 as the paper sheet 32 passes beneath the hood 59 in the manner peviously described. If desired, the hood 59 can be substantially sealed to the moving flexible wall 15 of the belt means 11 as the same passes underneath the same by annular seal means 70 carried by the hood 59 in much the same manner as the seal means provided by the hood means of the air-through dryer of the U.S. Pat. Villalobos, No. 3,541,697. Also, the air jet producing structure 58 can be removed as the belt 11 of this invention will provide its own individual air jet flow as previously described.

The Burgess dryer 80 of FIGS. 8 and 9 comprises a high velocity air flow hood 81 disposed about a rotatably mounted drum 82 having openings 83 passing therethrough and being covered on the outer side 84 thereof by a wire, fabric, or other porous covering 85 as illustrated to prevent marking of the paper sheet 32 when the same is pressed against the drum 82. The interior 86 of the drum 82 is adapted to be interconnected to a vacuum source by a central conduit means 87 having openings 88 therein leading to the chamber 86 and to the interior 89 of the conduit means 87 that is interconnected to the vacuum source in any suitable manner.

The paper sheet 32 can be fed from a conventional steam dryer "can" 90 to a guide roller 91 that causes the paper sheet 32 to engage against the covering 85 on the roll or drum 82 and be carried therewith through the chamber 92 created between the hood 81 and the drum 82 to an exit guide roller 93 and, thus, to another dryer can 94.

The interior 92 of the dryer hood 81 is supplied with heated air under pressure by an inlet conduit means 95 in any suitable manner so that the heated air in the chamber 92 will impinge against the sheet 32 to break down the boundary layer thereof to transfer heat thereto and also be passed through the paper sheet 32, covering 85, openings 83, and into the chamber 86 by the vacuum condition being created between the interior 86 of the drum 82 and the high pressure in the chamber 92 in the manner fully set forth in the U.S. patent to Burgess et al.

In order to substantially seal the chamber 92 from the exterior of the hood 81, flexible seals 96 and 97 are carried by the hood 81 and respectively engage against the guide rollers 91 and 93 as illustrated. Also, as illustrated in FIG. 9, the peripheral edge 98 of the dryer hood 81 can carry a brush or flexible seal 99 that engages against the surface 84 of the drum 82 outboard of the covering 85 thereon as illustrated. In addition, a high pressure air lock sealing means 100 can be provided adjacent the periphery 98 of the hood 81 to prevent the high pressure heated air in the chamber 92 from escaping to the atmosphere by the use of high pressure unheated air in the air lock 100 in substantially the manner set forth in the cole et al., U.S. Pat. No. 3,432,936, which also discloses an air-through dryer of the air pressure hood type having such air lock sealing means.

The belt means 11 of this invention is confined entirely within the hood chamber 92 whereby the belt means 11 passes around the inlet guide roller 101 so that its fabric or porous covering side 20 will engage against the paper sheet 32 at the inlet side 102 of the air-through dryer 80 and move in unison therewith to the exit side 103 of the air-through dryer 80 where the belt 11 is looped around a guide roller 104. The return run of the belt 11 is spaced from the drum 82 by passing around other guide rollers 105, 106 and 107 and then back to the inlet guide roller 101.

An internal seal member 108 is carried by the conduit means 87 and seals against the interior surface 109 of the drum 82 from just beneath the exit guide roller 104 all the way across to just beneath the inlet guide roller 101 as illustrated so that the only air flow that can take place from the chamber 92 into the interior 86 of the drum 82 is through the belt 11 from the inlet guide roller 101 around to the exit guide roller 104.

Because the belt means 11 of this invention is completely disposed within the chamber 92 of the hood 81, the same retains its latent heat that is treated by the heated air passing into the chamber 92. However, in order to further heat the belt means 11 of this invention, suitable heaters 110 can be utilized to heat the return run of the belt means 11 before the same is pressed against the moist sheet 32 at the inlet guide roller 101.

The operation of the air-through apparatus 80 is modified by the belt means 11 will now be described.

As the moist paper sheet 32 enters the air-through apparatus 80 by passing around part of the guide roller 91, the same passes between the belt means 11 of this invention and the covering 85 of the drum 82 to be carried in unison therewith through the chamber 92 to the exit guide roller 104 where the belt means 11 moves away from the same. However, as the paper material 32 moves from the inlet guide roller 101 to the exit guide roller 104, the pressure differential created across the belt means 11 of this invention by the air pressure in the chamber 92 and the vacuum condition in the chamber 86 causes the air to pass through the openings 16 of the flexible wall 15 of the belt means 11 to produce the air impingement jet effect previously described against the paper sheet 32 with such air flow then passing through the paper 32, covering 85 and openings 83 of the drum 82 into the drum chamber 86 to be exhausted in the manner previously described out through the conduit 87 so that as the paper sheet 32 moves from the inlet guide roller 101 to the exit guide roller 104, the moisture content thereof is progressively reduced whereby the normal tendency is for the porosity of the paper sheet 32 to increase as the moisture content thereof is reduced from the inlet guide roller 101 to the exit guide roller 104.

However, it is one of the features of this invention to tend to provide a substantially constant air flow through the paper sheet 32 as the same moves from the inlet guide roller 101 to the exit guide roller 104, even though the moisture content thereof is being progressively reduced and, thus, the porosity thereof is being progressively increased so that the tendency would be for the air to flow through the more porous portions of the sheet 32 with a greater rate than through the less porous portions thereof adjacent the inlet guide roller 101.

By way of example, assume that the combination of the force of the air pressure in the chamber 92 and the vacuum condition in the chamber 86 would normally cause an average air flow rate through the paper sheet 32, if the belt means 11 of this invention were removed, at a value 10K where K is equal to some measurement of air flow and 10K is calculated to be the optimum air flow rate for the particular paper web 32. This may mean that adjacent the inlet roller 101 where the paper web 32 is more moist and, thus, less porous, the air flow rate therethrough may be only 5K, whereas adjacent the middle roller 106 the air flow through the particularly dried web 32 may be at the optimum 10K, whereas adjacent the exit guide roller 104 the air flow through the paper web 32 may be at 15K. Thus, if it is found that the optimum air flow rate through the particular web 32 should be 10K, from the inlet guide roller 101 to the exit guie roller 106 an insufficient amount of air flow is being provided through the web 32 adjacent the inlet roller 101 whereas from the middle guide roller 106 to the exit guide roller 104, a greater amount of air flow is being provided through the paper web 32 over the optimum amount desired so that considerable waste of drying air for adiabatic drying purpose is being wasted at both the beginning and ending portions of the paper web travel through the apparatus 80.

However, it is believed that by utilizing the belt means 11 of this invention, the air flow rate created thereby through the paper web 32 adjacent the inlet guide roller 101 will be substantially the same as the air flow rate through the paper web 32 adjacent the exit guide roller 104 because the belt means 11 of this invention can be adapted to continuously and progressively compress the paper web 32 from the inlet guide roller 101 to the exit guide roller 104 with an increasing amount of pressure so that the resultant porosity of the paper web 32 will remain the same from the inlet guide roller 101 to the exit guide roller 104 thereof.

For example, reference is now made to FIG. 10 wherein the compressing action of the belt means 11 of this invention is indicated in straight line form, with the left-hand part thereof being adjacent the inlet guide roller 101 thereof and the right-hand portion thereof being adjacent the exit guide roller 104. It can be seen that as the porosity of the paper web 32 increases because of its increasing water removal therefrom as the web 32 passes from left to right in FIG. 10, the tendency would be for more air to flow through such dryer portions of the web 32. However, as the paper web 32 becomes more porous, the pressure differential across the belt means 11 of this invention would correspondingly increase so that the resultant pressure force acting on the belt means 11 to move the belt 11 toward the backing means 82 increases and squeezes the paper web 32 with a greater force than the force on the belt 11 where the paper web 32 is more moist, and, thus, less porous, so that the resultant effect is to reduce the porosity of the paper web 32 from its normal porosity at the dryer portions thereof to thereby only permit the same air flow rate therethrough as being provided in the moist portions thereof.

Thus, it can be seen in FIG. 10 that the initial compressing of the belt 11 against the paper web 32 at the inlet side of the apparatus 80 can cause the porosity of the paper web 32 adjacent the inlet guide roller 101 to be 5X where X is a suitable measurement of porosity so as to permit an optimum air flow rate therethrough of 10K whereas the normal removal of water from the paper web 32 by an air flow therethrough would cause the paper web 32 adjacent the exit roller 104 at the right hand end of FIG. 11 to normally be at a porosity of 10X. However, because the belt means 11 is compressing the paper web 32 adjacent the right hand side of FIG. 11 with a greater force than adjacent the left hand side thereof, such compressing force has reduced the porosity of the dryer portions of the paper web 32 to the same 5X porosity as at the inlet side thereof so that the air flow rate therethrough is still at the optimum air flow rate of 10K.

Such compressing action can be visualized by realizing that the air pressure on the lower side 17 of the flexible wall 15 in FIG. 10 is at one pressure value and tends to force the flexible wall 15 toward the paper web 32 while tending to pass through the openings 16 thereof into the area or fabric covering 19 between the flexible wall 15 and the paper web 32 so that when the web 32 has a particular porosity that resists the air flow therethrough, a back pressure of air builds up in the covering 19 to tend to push the flexible wall away from the paper web 32 whereby the resultant pressure differential between the air pressure in the covering 19 and the air pressure on the side 17 of the wall 15 determines the effective squeezing force of the belt means 11 acting on the paper web 32 and tending to compress the paper web 32 against the backing 82.

Thus, the less porous the material 32 is adjacent the belt means 11, the smaller the resultant pressure differential acting across the flexible wall 15 and, thus, the less the compressing force being provided by the belt means 11 against the paper web 32. However, as the porosity of the paper web 32 increases because of the moisture being removed therefrom by the air flow passing therethrough as the paper web travels from left to right in FIG. 10, the result of the increasing porosity of the paper 32 is to cause a reduction in the back air pressure in the covering 19 because a greater flow rate of air can now pass through the less porous paper 32 from the covering 19. However, because the pressure in the covering 19 now goes down, the resulting pressure differential acting across the flexible wall 15 correspondingly increases in vlaue so that the net result is a greater pushing force of the belt means 11 against the paper web 32 to compress the same and by thus compressing the paper web 32 with a greater force the porosity thereof decreases so that the porosity of the paper web from left to right in FIG. 10 remains substantially the same and the air flow rate through the paper web 32 from left to right in FIG. 10 remains substantially constant. Should a particular section of the belt means 11 compress the paper web 32 with too great a force so that the porosity of the paper web 32 being squeezed thereby is reduced to too great of an extent, such as to 4X, the flow rate therethrough drops off to 9K whereby the back pressure in the covering 19 builds up to reduce the resulting pressure differential acting across the flexible wall 15 so that the flexible wall 15 somewhat backs off from the paper web 32 whereby the paper web 32 will expand slightly until its porosity will be at the value 5X and, thus, the air flow therethrough will return to the constant 10K rate.

In this manner, not only is a constant air flow provided through the paper web 32 from the inlet roll 101 to the exit roll 104 in the manner previously described because of the compressing effect of the belt means 11 thereon tending to maintain the porosity of the paper web 32 substantially the same from the inlet guide roller 101 to the exit guide roller 104, but also such belt means 11 is acting on the paper web 32 from one longitudinal side edge thereof to the other longitudinal side edge thereof in the same manner so that in the cross direction of the paper web 32, the porosity of the paper web 32 will remain substantially constant and the air flow therethrough will remain substantially constant because in the dryer portions of the web 32, the belt means 11 will be compressing the same with a greater force than in the wetter regions thereof in the manner previously described.

Also, a greater sealing is effected at the longitudinal side edges of the paper web 32 in the manner illustrated in FIG. 9 because the flexible belt means 11 of this invention overlap such longitudinal side edges and conforms to the contour thereof to effect positive sealing against the drum 82 so that the entire air flow into the drum 82 must pass through the belt means 11 of this invention, and, thus, into the paper web 32 moving in unison therewith around the supporting drum 82.

As previously stated, such compressing action on the belt means 11 of this invention to provide the constant air flow through the paper web 32 from the inlet side to the exit side of the air-through apparatus 80 also is accomplished by the belt means 11 applied to the other airthrough apparatus previously described as well as other appicable air-through apparatus.

Thus, a person can determine what is the optimum porosity for a particular paper web 32 and what air flow rate should be provided therethrough and once such figures have been calculated, a belt means 11 can be developed having the proper size of openings 16 provided therethrough so as to maintain the optimum air flow rate therethrough from the inlet side to the exit side of the air-through dryer utilizing the same whereby it is believed that a more economical use of the heated air in an air-through dryer will be provided by utilizing the belt means 11 of this invention.

Further, because the belt means 11 of this invention is in direct contact with the paper web 32 being dried thereby, heat is transferred into the paper web 32 by conduction and assists the air jets passing through the belt means 11 of this invention to break down the boundary layer of the paper web 32 to have all of the advantages of an air impingement device and the additional advantages of heat transfer by direct conduction, uniform air flow through the paper web and an initial compressing of the paper web to the desired porosity thereof at the inlet side of the air-through dryer which initial porosity will then remain substantially constant from the inlet side to the exit side thereof by the self-seeking compression action of the belt means 11 of this invention.

For example, it may be found that it is desirable to initially compress the paper web 32 at the inlet side of the air-through dryer by a certain amount, such as 30 percent, to produce a porosity thereof which will provide the optimum air flow rate therethrough for a particular pressure differential and for a particular air temperature so that when the initial porosity of the paper web 32 has been changed to an optimum porosity thereof, such optimum porosity of the paper web 32 will remain uniform throughout the travel of the paper web 32 through the air-through dryer.

The aforementioned description and theory of the compressing action of the belt 11 of this invention for tending to maintain a substantially constant air flow rate through the wet web 32 as it progresses from the inlet side to the outlet side of the air-through apparatus is based on the assumption that the fiber content and construction of the paper sheet 32 is substantially uniform throughout the entire sheet 32 as would be provided in textiles and if the covering 19 of the belt means 11 remains of the same porosity even though being compressed with greater forces. However, it is realized that in actual practice, a paper sheet is not uniform throughout the cross direction thereof so that after the paper sheet leaves the web forming section and the press section of a paper making machine, certain areas thereof are thicker than others, other areas have the fiber content and arrangement thereof different than other areas thereof, etc. and such irregularities also cause an irregularity in the moisture profile of the paper sheet so that it is found that it is actually desired to have a greater air flow rate through the wetter sections of the paper sheet than in the drier sections thereof as the sheet passes through an air through dryer to more uniformly dry the paper sheet or web.

It is believed that the flexible belt 11 of this invention can be so constructed and arranged that the same will cause a greater air flow through the wetter sections of the paper sheet than through the dryer sections thereof if the covering 19 of the flexible belt 11 is formed of a certain type of material that decreases its porosity as it is compressed. Thus, because a dryer section of the paper sheet 32 is more porous than a wetter section of the web 32, the flexible belt 11 of this invention tends to compress the dryer section in the manner previously described to change the porosity of the dryer section to the same porosity as the wet sections at the inlet side of the air-through dryer. Such compressing action of the flexible belt 11 of this invention also causes the compressible fabric covering 19 thereof to compress to reduce its porosity and its volume content as well as cause a partial closing of the openings 16 in the flexible wall 15 aligned therewith so that the volume or rate of air passing through the flexible belt 11 in a compacting portion thereof as caused by a corresponding dryer portion of paper web 32 adjacent thereto is at a flow rate less than the rate of flow of air being passed through the wetter sections of the paper sheet 32.

Thus, it can be realized that the flexible belt 11 of this invention while tending to maintain a constant air flow through the paper sheet from the inlet side to the outlet side of the air-through dryer as well as in a cross direction of the paper sheet 32 also tends to force a greater air flow rate through the wetter sections of the paper than through the dryer sections thereof because of the aforementioned compressing action on the compressible covering layer 19 thereof. In fact, it may be found that the openings 16 in the flexible wall 15 of the belt means 11 may themselves tend to close up more in the areas thereof that are doing the greatest compressing than in the areas thereof which are doing the least compressing thereof which would be those areas of the belt 11 adjacent the wetter sections of the paper 32.

Therefore, by selecting the proper material for the covering 19, the covering 19 can provide a minimum desired air flow rate therethrough when fully compressed by the effect of a dry section of paper web adjacent the same and a maximum desired air flow rate when least compressed by the effect of a wetter section of paper adjacent the same.

Accordingly, the covering 19 will be less compressed and therefore more porous adjacent the wet sections of paper and more compressed and therefore less porous adjacent the dryer sections of paper so that the belt means 11 of this invention actually seeks out the wetter sections of paper to force a greater air flow rate therethrough than at the drier section.

Thus, it is believed that the greater air flow rate through the wetter sections of the paper web will produce a more economical water removal operation whether the same is an air sweeping of the moisture, an air entrainment of the moisture, or an air adiabatic evaporation of the moisture.

In fact, by having the compressible covering 19 on the flexible sheet 15 of the belt 11 of this invention, the air flow rate through the belt 11 and through the paper sheet 32 may actually be greater adjacent the inlet side of the particular air-through apparatus utilizing such belt 11 than the flow rate thereof adjacent the outlet side thereof because the wetter sections are adjacent the inlet side whereby a greater drying effect is created at the inlet side than at the outlet side of the apparatus.

Returning now to FIG. 8, it is to be understood that the belt means 11 of this invention need not be in contact with the paper web 32 throughout its entire movement through the hood 81. For example, reference is now made to FIG. 12 wherein another air-through dryer of the Burgess type is generally indicated by the reference numeral 80A and parts thereof similar to the apparatus 80 previously described are indicated by like reference numerals followed by the reference letter "A".

As illustrated in FIG. 12, the belt means 11A is only in engagement with the paper web 82A from the inlet guide roller 101A to a middle guide roller 111 which is located only approximately half-way around the drum 82A so that from the roller 111 to the exit roller 93, the paper web 32 is not covered by the belt means 11A of this invention.

However, the seal structure 108A of the apparatus 80A is so constructed and arranged that the same defines two separate chambers 112 and 113 in the drum 82 with such chambers 112 and 113 being independently acted on by vacuum creating means so that the chamber 112 cooperates with the belt means 11A of this invention in the manner previously described and the chamber 113 acts on the paper web 32 in combination with the hood 81A in the conventional air-through manner described in the Burgess et al. patent. Thus, it may be found that the shorter length of time that the belt means 11A makes contact with the paper web 32A is sufficient and that it is desirable to merely have a direct air flow through the paper web 32A after such compressing belt action in order to fluff such paper thereby in order to add bulk thereto such as for tissue, toweling, and like uses of the paper web 32.

Thus, it can be seen in that the various types of air through dryers illustrated in FIGS. 1, 2, 3, 8 and 12, the belt means 11 of this invention is believed to improve the operation thereof because the belt means 11 causes the web or sheet to be continuously and progressively compressed or squeezed so that as the same passes through the air through dryer, the moisture therein not only tends to continuously fill all voids thereof and be readily swept therefrom by the air flow therethrough than would be the case if the air flow through the paper sheets is merely trying to remove moisture therein by air entrainment rather than by sweeping the same ahead of the high velocity of the air flow passing therethrough, but also such belt means 11 is maintaining the porosity of the paper web in what is believed to be optimum porosity thereof even though the moisture in the paper web is being removed therefrom so as to normally tend to increase the porosity of the paper web whereby a more effective and constant air flow rate is provided through the paper web to further enhance the drying thereof.

While the form of the invention now preferred has been disclosed and described as required by the patent statutes, other forms may be utilized, all coming within the scope of the claims which follow.

What is claimed is:

1. In a fluid through apparatus for treating porous material by fluid flowing substantially transversely through the material by a pressure differential being created across the material as the same passes through a pressure differential creating zone of said apparatus, the improvement comprising means for automatically causing a greater fluid flow rate through the lesser porous areas of a particular section of said material than the normal fluid flow rate therethrough normally caused by such areas being less porous than the more porous areas of said section of said material when said section of said material is in said zone and regardless of the relative locations of said lesser porous and more porous areas in said section.

2. In a fluid through apparatus as set forth in claim 1, the further improvement wherein said porous material is wet material and said fluid is gaseous whereby said lesser porous areas are the wetter areas and said more porous areas are the drier areas of said section of said material.

3. In a fluid through apparatus as set forth in claim 1, the further improvement wherein said means for automatically causing a greater fluid flow rate through the lesser porous areas of said particular section of said material also automatically causes the fluid flow rate through all areas of said section of said material that is in said zone to be substantially the same regardless of the different porosity of said areas of said material that are in said zone at that time.

4. In a fluid through apparatus as set forth in claim 1, the further improvement wherein said means for automatically causing a greater fluid flow rate through the lesser porous areas of a particular section of said material comprises a flexible wall means for engaging against said material as the same passes through said zone of said apparatus and being disposed on the higher pressure side of said material, said flexible wall means having means for causing the fluid flow to compress said flexible wall means against said material while flowing through said flexible wall means into said material to treat the same.

5. In a fluid through apparatus as set forth in claim 4, the further improvement wherein said flexible wall means has a flexible wall having opening means passing therethrough, said flexible wall means having a fluid open covering on the side of said flexible wall that is to engage said material.

6. In a fluid through apparatus as set forth in claim 5, the further improvement wherein said fluid open covering is formed of compressible material.

7. In a fluid through apparatus as set forth in claim 5, the further improvement wherein said fluid open covering is formed of non-compressible material.

8. In a fluid through method for treating porous material by fluid flowing substantially transversely through the material when the material is passed through a pressure differential creating zone, the improvement comprising the step of automatically causing a greater fluid flow rate through the lesser porous areas of a particular section of said material than the normal fluid flow rate therethrough normally caused by the lesser porous areas being less porous than the more porous areas of said section of said material when said section of said material is in said zone and regardless of the relative locations of said lesser porous and more porous areas in said section.

9. In a fluid through method as set forth in claim 8, the further improvement wherein said porous material is wet material and said fluid is gaseous whereby said lesser porous areas are the wetter areas and said more porous areas are the drier areas of said section of said material.

10. In a fluid through method as set forth in claim 8, the further improvement wherein the step of automatically causing a greater fluid flow rate through the lesser porous areas of a particular section of said material comprises the step of also automatically causing the fluid flow rate through all areas of said section of said material that is in said zone to be substantially the same regradless of the different porosity of said areas of said material that are in said zone at that time.

11. In a fluid through method as set forth in claim 8, the further improvement wherein the step of automatically causing a greater fluid flow rate through the lesser porous areas of a particular section of said material comprises the step of providing a flexible wall means for engaging against said material as the same passes through said zone and being disposed on the higher pressure side of said material, said flexible wall means having means for causing the fluid flow to compress said flexible wall means against said material while flowing through said flexible wall means into said material to treat the same.

12. In a fluid through method as set forth in claim 11, the further improvement wherein said step of providing said flexible wall means comprises the step of providing a flexible wall having opening means passing therethrough, said flexible wall means having a fluid open covering on the side of said flexible wall that is to engage said material.

13. In a fluid through method as set forth in claim 12, the further improvement comprising the step of forming said fluid open covering from compressible material.

14. In a fluid through method as set forth in claim 12, the further improvement comprising the step of forming said fluid open covering from non-compressible material.

15. In a fluid-through apparatus for treating porous material by fluid flowing substantially transversely through the material by a pressure differential being created across the material as the same passes through said apparatus, the improvement comprising a porous wall means being disposed in a sandwich relation with said porous material and through which sandwich said fluid flows by said pressure differential, and means for changing the porosity of at least one area of said porous wall means to change the amount of fluid flow therethrough and thus change the amount of fluid flow through a corresponding area of said porous material disposed adjacent thereto from the amount that said pressure differential would normally cause to flow therethrough, said means changing the porosity of said porous wall means changing the porosity of said porous wall means in a manner, to cause a greater fluid flow rate through the lesser porous areas of a particular section of said porous material than the normal fluid flow rate therethrough normally caused by such areas being less porous than the more porous areas of said section of said material when said section of said porous material is in the pressure differential zone and regardless of the relative locations of said more porous and lesser porous areas in said section of said porous material.

16. In a fluid-through apparatus as set forth in claim 15, the further improvement wherein said porous wall means comprises a flexible porous wall means for engaging against said porous material as the same passes through said zone of said apparatus and being disposed on the higher pressure side of said porous material, said flexible wall means having means for causing the fluid flow to compress said flexible wall means against said porous material while flowing through said flexible wall means into said material to treat the same.

17. In a fluid-through apparatus as set forth in claim 16, the further improvement wherein said flexible wall means has a flexible wall having opening means passing therethrough, said flexible wall means having a fluid open covering on the side of said flexible wall that is to engage said porous material.

18. In a fluid-through apparatus as set forth in claim 17, the further improvement wherein said fluid open covering is formed of compressible material.

19. In a fluid-through apparatus as set forth in claim 17, the further improvement wherein said fluid open covering is formed of non-compressible material.

20. In a fluid-through method for treating porous material by fluid flowing substantially transversely through the material when the material is passed through a pressure differential creating zone, the improvement comprising the steps of disposing a porous wall means in sandwich relation with said porous material so that said fluid flows through said sandwich when disposed in said pressure differential creating zone, and changing the porosity of at least one area of said porous wall means to change the amount of fluid flow therethrough and thus change the amount of fluid flow through a corresponding area of said porous material disposed adjacent thereto from the amount that said pressure differential creating zone would normally cause to flow therethrough, said step of changing the porosity of said porous wall means changes the porosity of said porous wall means in a manner to cause a greater fluid flow rate through the lesser porous areas of a particular section of said porous material than the normal fluid flow rate therethrough normally caused by the lesser porous areas being less porous than the more porous areas of said section of said porous material when said section of porous material is in said zone and regardless of the relative locations of said more porous and lesser porous areas in said section of said porous material.

21. In a fluid-through method as set forth in claim 12, the further improvement wherein said porous wall means comprises a flexible porous wall means engaging against said porous material as the same passes through said zone and being disposed on the higher pressure side of said porous material, said flexible wall means having means for causing the fluid flow to compress said flexible wall means against said porous material while flowing through said flexible wall means into said porous material to treat the same.

22. In a fluid-through method as set forth in claim 21, the further improvement wherein said flexible wall means comprises a flexible wall having opening means passing therethrough, said flexible wall means having a fluid open covering on the side of said flexible wall that is to engage said porous material.

23. In a fluid-through method as set forth in claim 22, the further improvement wherein said fluid open covering is formed of compressible material.

24. In a fluid-through method as set forth in claim 22, the further improvement wherein said fluid open covering is formed of non-compressible material.

* * * * *